(12) United States Patent
Peng

(10) Patent No.: US 11,733,750 B2
(45) Date of Patent: Aug. 22, 2023

(54) POWER SWITCHING CIRCUITRY AND ETHERNET APPARATUS USING THE SAME

(71) Applicant: Alpha Networks Inc., Hsinchu (TW)

(72) Inventor: Ming-Chih Peng, Hsinchu (TW)

(73) Assignee: ALPHA NETWORKS INC., Hsinchu (TW)

( * ) Notice: Subject to any disclaimer, the term of this patent is extended or adjusted under 35 U.S.C. 154(b) by 0 days.

(21) Appl. No.: 17/826,204

(22) Filed: May 27, 2022

(65) Prior Publication Data

US 2023/0087581 A1    Mar. 23, 2023

(30) Foreign Application Priority Data

Sep. 22, 2021   (TW) .................................. 110135122

(51) Int. Cl.
| | |
|---|---|
| G06F 1/26 | (2006.01) |
| G06F 1/18 | (2006.01) |
| H04L 12/10 | (2006.01) |
| H02J 1/08 | (2006.01) |

(52) U.S. Cl.
CPC ............. G06F 1/263 (2013.01); G06F 1/189 (2013.01); G06F 1/266 (2013.01); H02J 1/084 (2020.01); H04L 12/10 (2013.01)

(58) Field of Classification Search
CPC .......... G06F 1/189; G06F 1/263; G06F 1/266; G06F 1/28; H04L 12/10; H04L 12/12; H02J 1/084; H02J 13/0003
See application file for complete search history.

(56) References Cited

U.S. PATENT DOCUMENTS

| | | | |
|---|---|---|---|
| 2007/0079151 A1* | 4/2007 | Connor ................... | G06F 1/263 713/300 |
| 2008/0104427 A1* | 5/2008 | Yee .................... | H04L 12/40045 713/300 |
| 2010/0042855 A1* | 2/2010 | Karam ...................... | G06F 1/26 713/300 |
| 2011/0125341 A1* | 5/2011 | Heath ..................... | H04L 12/10 700/295 |
| 2015/0127958 A1* | 5/2015 | Yoshino .................... | G06F 1/30 713/300 |
| 2016/0273959 A1* | 9/2016 | Wang .................. | H04B 10/6911 |
| 2019/0096148 A1* | 3/2019 | Hopkins ............ | G07C 9/00571 |
| 2019/0129485 A1* | 5/2019 | Amano ................... | H04L 12/12 |
| 2019/0148937 A1* | 5/2019 | Kawamoto ............. | H02J 1/102 307/80 |
| 2019/0250683 A1* | 8/2019 | Huang ..................... | G06F 1/266 |
| 2020/0084378 A1* | 3/2020 | Kawamoto ............ | H04N 23/65 |
| 2021/0006420 A1* | 1/2021 | Neyland .............. | H04B 7/0426 |

* cited by examiner

*Primary Examiner* — Thomas J. Cleary
(74) *Attorney, Agent, or Firm* — Wpat, P.C

(57) ABSTRACT

A power switching circuitry and ethernet apparatus using the same is provided. The power switching circuitry comprises an external power socket for receiving external power, an ethernet power supply pin for receiving power over ethernet, a sensing circuitry, and a power output decision module, and determines whether the power over ethernet is applied to an internal circuit in accordance with position variations of the socket pins of the external power socket.

8 Claims, 3 Drawing Sheets

POWER SWITCHING CIRCUITRY AND ETHERNET APPARATUS USING THE SAME

FIELD OF THE INVENTION

The present invention relates generally to a power switching circuitry. More particularly, the present invention relates to a power switching circuitry which switches power in accordance with positions of pins inside a power socket and an ethernet apparatus using the power switching circuitry.

BACKGROUND OF THE INVENTION

Power over ethernet (POE) is a technology which transmits power and data to electronic apparatuses within ethernet through twisted-pair cables. When the power required by one electronic apparatus using POE technology is not very large, normal operations of the electronic apparatus could be accomplished without introducing other power sources to the electronic apparatus. Therefore, costs and problems generated due to configuring power cables of the electronic apparatus using the POE technology are saved.

Due to limited power supplying capability of the power over ethernet, circuitry for connecting to external power sources other than the power over ethernet is still reserved in some of the electronic apparatuses using the POE technology to receive power from the external power sources when a lot of power is consumed by the electronic apparatuses. However, because the power requirement of one electronic apparatus could be varied quickly, power switching between different power sources might be not timely responded in the electronic apparatus when power switching operation thereof is performed manually. Popularity of POE technology is therefore limited.

SUMMARY OF THE INVENTION

One of the objects of the present invention is to provide a power switching circuitry and ethernet apparatus which automatically performs power switching operation in accordance with power sources connected thereto.

In one aspect, the present invention provides, in following descriptions, drawings and embodiments, a power switching circuitry for selecting and transmitting one of a plurality of power sources to a working circuitry. The power switching circuitry comprises an external power socket, an ethernet power supply pin, a sensing circuitry, and a power output decision module. The external power socket comprises a first socket pin, a second socket pin and a third socket pin, wherein the external power socket is adapted to be connected to an external power plug such that the first socket pin is electrically coupled to the external power source for receiving a first input power from the external power source through the external power plug and transmitting the first input power toward the working circuitry, the second socket pin is electrically coupled to a first electric potential, and whether the second socket pin is connected with the third socket pin is determined by whether the external power plug is inserted into the external power socket. The ethernet power supply pin is electrically coupled to an ethernet cable for transmitting a second input power received from the ethernet cable toward the working circuitry. The sensing circuitry comprises a switch, a first resistor and an optocoupler, wherein the switch comprises a control end, a first conducting end and a second conducting end, whether the first conducting end is conducted with the second conducting end is determined by a voltage applied on the control end, and the second conducting end is electrically coupled to the first electric potential; a first end of the first resistor is electrically coupled to a power supplying node, and a second end of the first resistor is electrically coupled to the control end and the third socket pin; the optocoupler comprises a light emitting diode and a light sensor, wherein a first end of the light emitting diode is electrically coupled to the power supplying node, a second end of the light emitting diode is electrically coupled to the first conducting end of the switch, and whether a first end of the light sensor is conducted with a second end of the light sensor is determined by whether the light emitting diode emits light. The power output decision module is electrically coupled to the ethernet power supply pin, the first end of the light sensor and the second end of the light sensor, wherein the second input power received from the ethernet power supply pin is stopped being transmitted toward the working circuitry from the power output decision module when the first end of the light sensor is conducted with the second end of the light sensor.

In one embodiment, the external power source is direct current (DC) power source.

In one embodiment, the first electric potential is ground, and an electric potential of the power supplying node is the same as an electric potential provided by the external power source.

In one embodiment, the sensing circuitry further comprises a second resistor, wherein a first end of the second resistor is electrically coupled to the power supplying node, and a second end of the second resistor is electrically coupled to the first end of the light emitting diode.

In another aspect, the present invention provides, in following descriptions, drawings and embodiments, an ethernet apparatus comprising a working circuitry and a power switching circuitry. The working circuitry is provided by a first electric potential and a second electric potential and operated accordingly. The power switching circuitry comprises an external power socket, an ethernet power supply pin, a sensing circuitry and a power output decision module. The external power socket comprises a first socket pin, a second socket pin, and a third socket pin, wherein the external power socket is adapted to be connected to an external power plug such that the first socket pin is electrically coupled to an external power source for receiving a first input power from the external power source through the external power plug and transmitting the first input power toward the working circuitry, the second socket pin is electrically coupled to the first electric potential, and whether the second socket pin is connected with the third socket pin is determined by whether the external power plug is connected to the external power socket. The ethernet power supply pin is electrically coupled to an ethernet cable for transmitting a second input power received from the ethernet cable toward the working circuitry. The sensing circuitry comprises a switch, a first resistor comprising two ends, and an optocoupler, wherein the switch comprises a control end, a first conducting end and a second conducting end, whether the first conducting end is conducted with the second conducting end is determined by a voltage applied on the control end, and the second conducting end is electrically coupled to the first electric potential; a first end of the first resistor is electrically coupled to a power supplying node, and a second end of the first resistor is electrically coupled to the control end and the third socket pin; the optocoupler comprises a light emitting diode and a light sensor, wherein a first end of the light emitting diode is electrically coupled to the power supplying node, a second end of the light emitting diode is electrically coupled to the first conducting end of the switch, and whether a first end of the light sensor is conducted with a second end of the light sensor is determined by whether the light emitting diode emits light. The power output decision module is electrically coupled to the ethernet power supply pin, the first end of the light sensor, and the second end of the light sensor, wherein the second input power received from the ethernet power supply pin is stopped being transmitted toward the working circuitry when the first end of the light sensor is conducted with the second end of the light sensor.

In one embodiment, the external power source is direct current (DC) power source.

In one embodiment, the first electric potential is ground, and an electric potential of the power supplying node is the same as an electric potential provided by the external power source.

In one embodiment, the sensing circuitry further comprises a second resistor, wherein a first end of the second resistor is electrically coupled to the power supplying node, and a second end of the second resistor is electrically coupled to the first end of the light emitting diode.

In summary, the electrical characteristics of the sensing circuitry described herein is varied in accordance with position variation of the pins of the external power socket. Therefore, the power received from the external power plug is automatically provided toward the working circuitry when the external power plug is connected to the external power socket.

Please refer to the detailed description and the attached drawings for understanding the feature and technique content of the present invention. The attached drawings are only for providing reference and explanation but not for limiting the present invention.

DETAILED DESCRIPTION OF PREFERRED EMBODIMENTS

In order to make the description be easily understood by those with ordinary skills in the art, the term "A is electrically coupled to B" represents that an electronic signal can be transmitted between A and B in either unidirectional or bidirectional by either wired or wireless transmission means.

Figure 1:
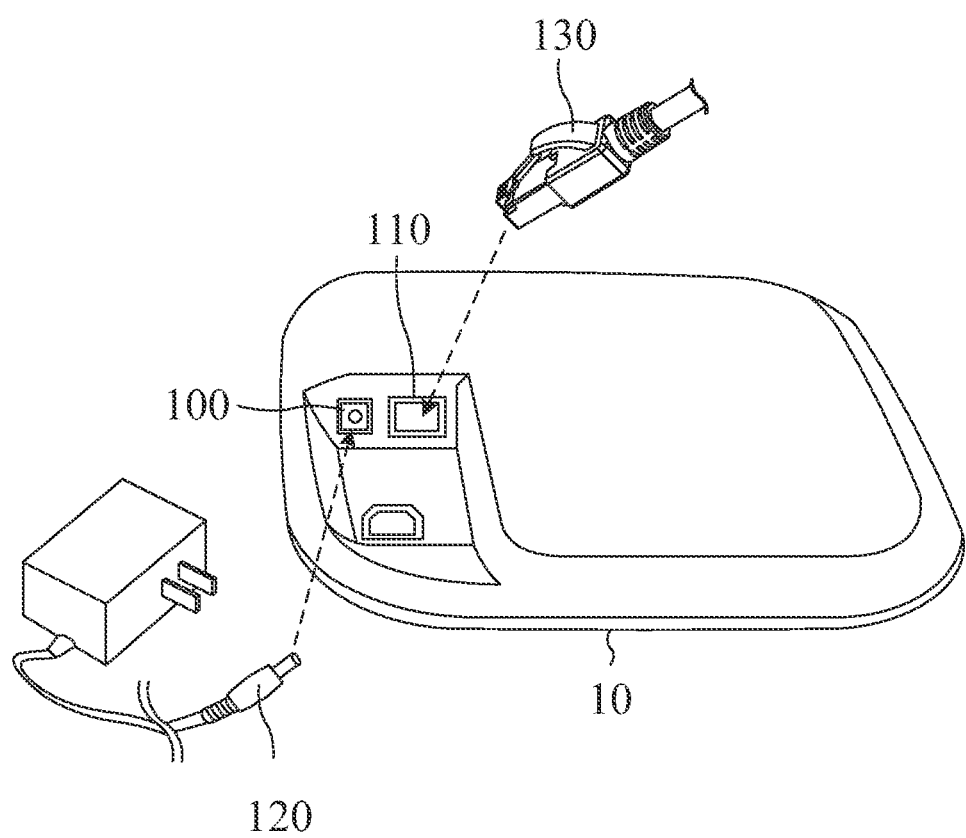
FIG. 1 is a schematic diagram of an ethernet apparatus in accordance with one embodiment of the present invention.

Please refer to FIG. 1, which is a schematic diagram of an ethernet apparatus in accordance with one embodiment of the present invention. As shown in the figure, an external power socket 100 and an ethernet cable socket 110 are provided on the ethernet apparatus 10. The external power socket 100 is adapted to be connected with a power adapter 120 and transmitting a direct current power provided from the power adapter 120 toward a working circuitry (not shown) inside the ethernet apparatus 10. The ethernet cable socket 110 is adapted to be connected with an ethernet cable 130 and transmitting a power provided by the ethernet cable 130 toward the working circuitry inside the ethernet apparatus 10.

Figure 2:
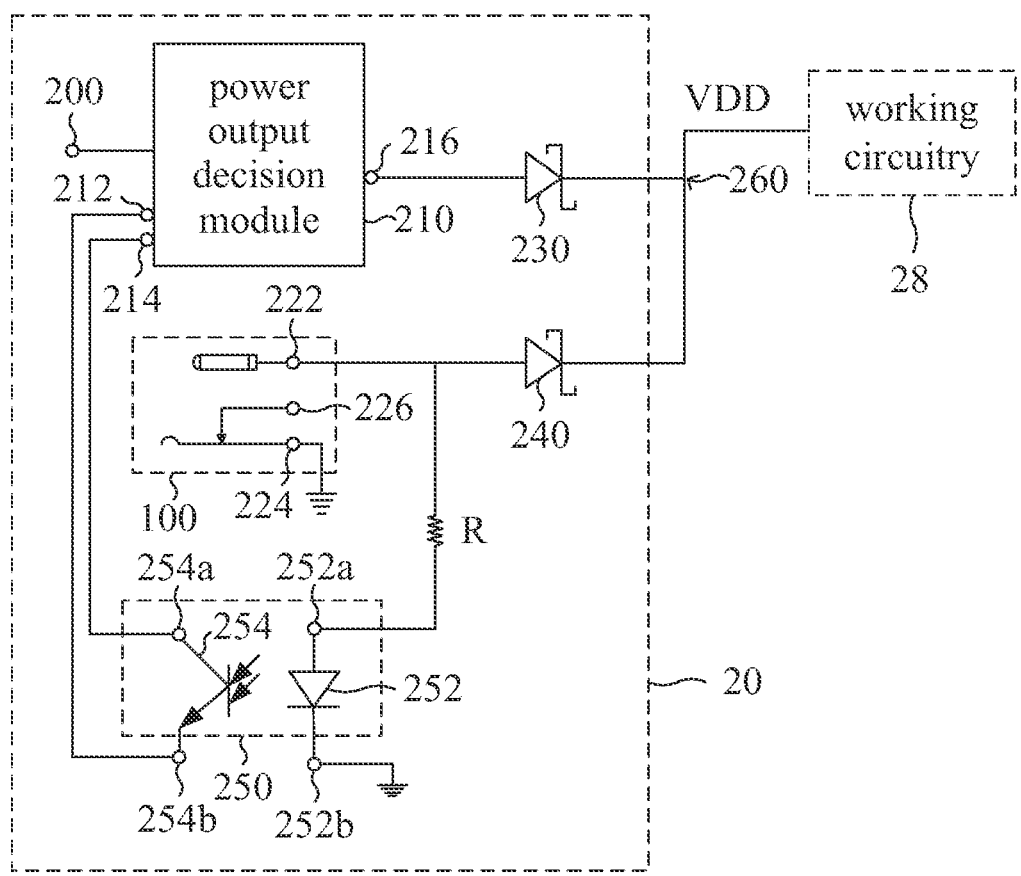
FIG. 2 is a circuitry diagram of a power switching circuitry adapted to the ethernet apparatus shown in FIG. 1.

Please also refer to FIG. 2, which is a circuitry diagram of a power switching circuitry adapted to the ethernet apparatus shown in FIG. 1. As shown in FIG. 2, a power switching circuitry 20 selects one of the power provided through the external power socket 100 and the power provided through the ethernet cable socket 110, and then transmits the selected power toward the working circuitry 28 of the ethernet apparatus 10, wherein, the power transmitted to the working circuitry 28 is provided as a high electric potential VDD on a power supplying node 260. On the one hand, while connecting a plug (also referred to as external power plug) of the power adapter 120 with the external power socket 100, the power generated by an external power source (also referred to as first input power) provided from the power adapter 120 is received by the socket pin 222 of the external power socket 100 because of the electrical connection built between the power adapter 120 and the external power socket 100. Thereafter, the first input power is further transmitted toward the working circuitry 28 through a diode 240 to complete the operation of transmitting the first input power toward the working circuitry 28. On the other hand, after inserting the ethernet cable 130 into the ethernet cable socket 110, the ethernet cable 130 is electrically coupled to the ethernet power supply pin 200 through the ethernet cable socket 110. Therefore, the power carried on the ethernet cable 130 (also referred to as second input power) is transmitted to the power output decision module 210. The power output decision module 210 determines whether a predetermined power, such as the second input power, should be provided on the output pin 216 by detecting whether the first input power does resist. Finally, the power provided on the output pin 216 is transmitted to the working circuitry 28 through a diode 230 to complete the operation of transmitting the second input power toward the working circuitry 28.

The electrical characteristics of an optocoupler 250 is checked by the power switching circuitry 20 to ensure that the power provided on the output pin 216 is determined by the power output decision module 210 in accordance with whether the first input power exists. More specifically, the optocoupler 250 comprises a light emitting diode 252 and a light sensor 254. One end 252a of the light emitting diode 252 is electrically coupled to the first socket pin 222 and the diode 240, another end 252b of the light emitting diode 252 is electrically coupled to ground. One end 254a of the light sensor 254 is electrically coupled to the control pin 214, and another end 254b of the light sensor 254 is electrically coupled to the control pin 212. It is noted that, the end 254a of the light sensor 254 is conducted with the end 254b of the light sensor 254 when the light emitting diode 252 emits light, and, on the contrary, the end 254a of the light sensor 254 is not conducted with the end 254b of the light sensor 254 when the light emitting diode 252 does not emit light. In other words, whether the end 254a is conducted with the end 254b is determined by whether the light emitting diode 252 emits light. In the circuitry architecture described above, the end 254a of the light sensor 254 is not conducted with the end 254b of the light sensor 254 when the electric potential provided on the first socket pin 222 is not enough for activating the light emitting diode 252 (that is, the power provided by the power adapter 120 is not enough), so that a current path beginning from the control pin 212, through the light sensor 254 and ending at the control pin 214 cannot be built even if a predetermined voltage between the two control pins 212 and 214 is provided by the power output decision module 210. On the contrary, the end 254a of the light sensor 254 is conducted with the end 254b of the light sensor 254 when the electric potential provided on the first socket pin 222 is enough for activating the light emitting diode 252, so that the current path beginning from the control pin 212, through the light sensor 254 and ending at the control pin 214 is built when a predetermined voltage between the two control pins 212 and 214 is provided by the power output decision module 210. Accordingly, it could be understood that there would be a current flowing through the two control pins 212 and 214 when the first input power exists, and, on the contrary, when the first input power does not exist, there is no current flowing through the two control pins 212 and 214. Therefore, in this embodiment, the power output decision module 210 is designed to output power on the output pin 216 when there is no current flowing through the control pins 212 and 214, and, on the contrary, the power output decision module 210 would not provide power on the output pin 216 when there is current flowing through the control pins 212 and 214. As a result, a predetermined power being transmitted toward the working circuitry 28 is provided on the output pin 216 by the power output decision module 210 when there is no current flowing through the control pins 212 and 214, and, the power output decision module 210 stops providing power received from the second input power on the output pin 216 when there is a current flowing through the control pins 212 and 214.

Generally, an electronic element with proper resistance would be serially connected with the light emitting diode 252 for limiting the current flowing therethrough to prevent the light emitting diode 252 from being burned out because of excessive current. The resistor R in FIG. 2 is used as the electronic element limiting the current flowing through the light emitting diode 252.

It could be understood from the above description that the circuitry shown in FIG. 2 could complete the operation of automatically switching between two input power sources. However, because the power provided by the output pin 216 could also drive the light emitting diode 252, it is possible that the power output decision module erroneously recognizes the power provided by the output pin 216 as the power provided by the first socket pin 222. Accordingly, in order to prevent the power provided by the output pin 216 from being erroneously recognized by the power output decision module 210 as the power provided by the first socket pin 222, a diode 240 must be connected between the light emitting diode 252 and the output pin 216 to cut off the current path from the output pin 216 to the light emitting diode 252. Therefore, the diode 240 is necessary in the circuitry shown in FIG. 2.

Figure 3:
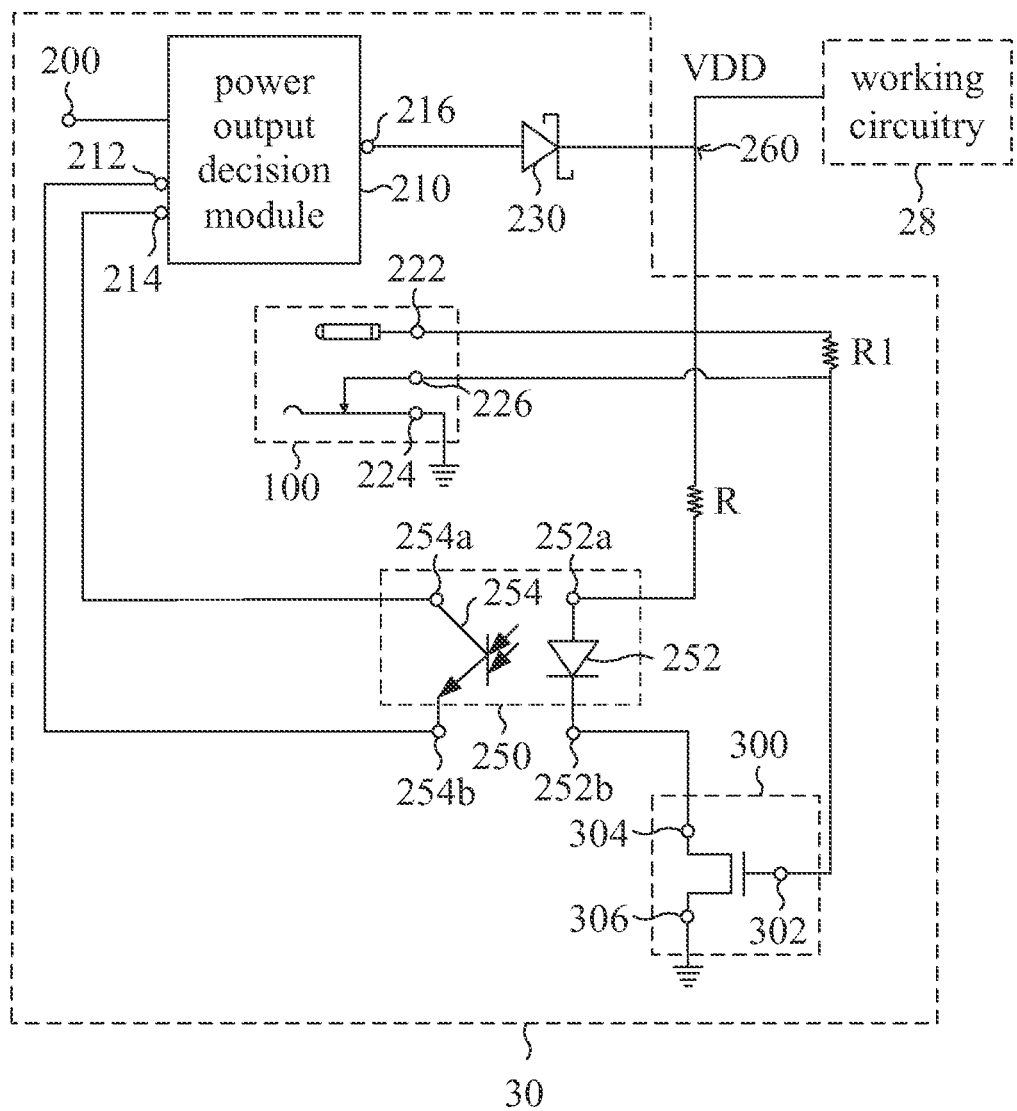
FIG. 3 is a circuitry diagram of a power switching circuitry, which is adapted to the ethernet apparatus shown in FIG. 1, in accordance with one embodiment of the present invention.

Please refer to FIG. 3, which is a circuitry diagram of a power switching circuitry, which is adapted to the ethernet apparatus shown in FIG. 1, in accordance with one embodiment of the present invention. In the embodiment, the power switching circuitry 30 mainly comprises an external power socket 100, an ethernet power supply pin 200, a sensing circuitry and a power output decision module 210. Similar to those shown in FIG. 2 and described above, after inserting the ethernet cable 130 into the ethernet cable socket 110, the ethernet cable 130 is electrically coupled to the ethernet power supply pin 200 through the ethernet cable socket 110. Therefore, the second input power carried on the ethernet cable 130 is transmitted to the power output decision module 210. Furthermore, the power provided on the output pin 216 is determined by the power output decision module 210 in accordance with whether there is current flowing through the control pins 212 and 214. Finally, the power provided on the output pin 216 is transmitted to the working circuitry 28 through the diode 230 to complete the operation of transmitting the second input power toward the working circuitry 28.

Furthermore, in the embodiment, the external power socket 100 comprises a first socket pin 222, a second socket pin 224 and a third socket pin 226. The first socket pin 222 is adapted to be connected with an external power plug, such as the plug of the power adapter 120 shown in FIG. 1, and forwards the first input power received from the external power plug toward the working circuitry 28. The second socket pin 224 is electrically coupled to ground (hereinafter also referred to as first electric potential), and whether the second socket pin 224 is connected with the third socket pin 226 is determined by whether the external power plug is connected to the external power socket 100. A direct current jack (DC jack) is adapted to be used as the external power socket 100. It is noticed that, any socket which meets the described requirement of socket pins of the external power socket 100 can be used in the embodiment, and, therefore, the structure of the external power socket in the present invention is not limited to those shown in FIG. 3.

As shown in FIG. 3, the sensing circuitry of the present embodiment mainly comprises a switch 300, a resistor R1 and an optocoupler 250. Similar to those shown in FIG. 2 and described above, the optocoupler 250 comprises a light emitting diode 252 and a light sensor 254, wherein one end 252a of the light emitting diode 252 is electrically coupled to one end of the resistor R, and another end of the resistor R is electrically coupled to the first socket pin 222 and the power supplying node 260, wherein the electric potential on the power supplying node 260 is provided to the working circuitry 28 as the high electric potential VDD (hereinafter also referred to as second electric potential) used in the working circuitry 28. One end 254a of the light sensor 254 is electrically coupled to the control pin 214 of the power output decision module 210, and another end 254b of the light sensor 254 is electrically coupled to the control pin 212 of the power output decision module 210. In this embodiment, the switch 300 comprises a control end 302, a first conducting end 304 and a second conducting end 306, wherein whether the first conducting end 304 is conducted with the second conducting end 306 is determined by the voltage applied on the control end 302. Furthermore, as shown in FIG. 3, the control end 302 is electrically coupled to the third socket pin 226 and one end of the resistor R1, and another end of the resistor R1 is electrically coupled to the power supplying node 260. The first conducting end 304 is electrically coupled to the end 252b of the light emitting diode 252, and the second conducting end 306 is electrically coupled to the first electric potential, i.e., ground.

In the circuitry architecture shown in FIG. 3 and described above, the electric potential on the third socket pin 226 is the same as the first electric potential when the power adapter 120 is not connected to the external power socket 100 because the third socket pin 226 is contacted with the second socket pin 224. Therefore, the electric potential on the control end 302 of the switch 300 is the same as the third socket pin 226 and equals to ground. Because the electric potential on the control end 302 is ground, the electrical path between the first conducting end 304 and the second conducting end 306 would not be conducted so that the light emitting diode 252 does not emit light. Since the end 254a of the light sensor 254 is not conducted with the end 254b of the light sensor 254 when the light emitting diode 252 does not emit light, the current path beginning from the control pin 212, through the light sensor 254 and ending at the control pin 214 cannot be built even if a predetermined voltage between the control pins 212 and 214 is provided by the power output decision module 210. In other words, because the current flowing through the control pins 212 and 214 is zero when the power adapter 120 is not connected to the external power socket 100, the power output decision module 210 outputs the power obtained from the second input power on the output pin 216 to the working circuitry 28 as discussed above.

On the contrary, the second socket pin 224 is pushed away from the third socket pin 226 such that the second socket pin 224 is not connected to the third socket pin 226 when the power adapter 120 is connected to the external power socket 100, and, therefore, the third socket pin 226 is floating. Accordingly, both the electric potential on the third socket pin 226 and the electric potential on the control end 302 equal to the second electric potential VDD so that the electrical path between the first conducting end 304 and the second conducting end 306 is conducted and the light emitting diode 252 emits light, and the end 254a is conducted with the end 254b at the same time. Therefore, there would be current flowing through the current path beginning from the control pin 212, through the light sensor 254 and ending at the control pin 214 when a predetermined voltage is applied on the two control pins 212 and 214. In other words, because the current flowing through the control pins 212 and 214 is generated when the power adapter 120 is connected to the external power socket 100, the power output decision module 210 stops outputting the power obtained from the second input power on the output pin 216 as discussed above.

It is noted that the resistor R in the embodiment is used for limiting the current flowing through the light emitting diode 252 like what the resistor R in the FIG. 2 is. The resistor R can be arranged at other positions where the current flowing through the light emitting diode 252 is still limited by the resistor R. For example, the resistor R could be connected between the resistor R1 and the power supplying node 260, or the resistor R could be connected between the light emitting diode 252 and the switch 300.

It can be understood from the description made above that, because the switch 300 is used for controlling the current flowing through the light sensor 254, there is no need for connecting a diode between the first socket pin 222 and the working circuitry 28 to prevent the light sensor 254 from operating erroneously due to the second input power from the ethernet cable. Therefore, the energy lost generated by the voltage drop at the diode 240 shown in FIG. 2 is removed by using the embodiment shown in FIG. 3.

In summary, power switching operation could be performed automatically as described above by the power switching circuitry and the ethernet apparatus using the same. Moreover, unnecessary power lost is reduced because of the specific circuitry design made in the present invention.

It is noted that those with ordinary skill in the art are capable of making various modifications and arrangements in accordance with the technical solutions and technical ideas described above, and those modifications and arrangements should be covered by the scope of the appended claims of the present invention.

What is claimed is:

1. A power switching circuitry for selecting and transmitting one of a plurality of power sources to a working circuitry, comprising:
an external power socket, comprising a first socket pin, a second socket pin and a third socket pin, wherein the external power socket is adapted to be connected to an external power plug such that the first socket pin is electrically coupled to an external power source for receiving a first input power from the external power source through the external power plug and transmitting the first input power toward the working circuitry, the second socket pin is electrically coupled to a first electric potential, and whether the second socket pin is connected with the third socket pin is determined by whether the external power plug is connected to the external power socket;
an ethernet power supply pin, being electrically coupled to an ethernet cable for transmitting a second input power received from the ethernet cable toward the working circuitry;
a sensing circuitry, comprising:
a switch, comprising a control end, a first conducting end and a second conducting end, wherein whether the first conducting end is conducted with the second conducting end is determined by a voltage applied on the control end, and the second conducting end is electrically coupled to the first electric potential;
a first resistor, comprising two ends, wherein a first end of the first resistor is electrically coupled to a power supplying node, and a second end of the first resistor is electrically coupled to the control end and the third socket pin; and
an optocoupler, comprising a light emitting diode and a light sensor, wherein a first end of the light emitting diode is electrically coupled to the power supplying node, a second end of the light emitting diode is electrically coupled to the first conducting end of the switch, and whether a first end of the light sensor is conducted with a second end of the light sensor is determined by whether the light emitting diode emits light; and
a power output decision module, being electrically coupled to the ethernet power supply pin, the first end of the light sensor and the second end of the light sensor, wherein the second input power received from the ethernet power supply pin is stopped being transmitted toward the working circuitry when the first end of the light sensor is conducted with the second end of the light sensor.

2. The power switching circuitry of claim 1, wherein the external power source is direct current power source.

3. The power switching circuitry of claim 2, wherein the first electric potential is ground, and a second electric potential on the power supplying node is the same as an electric potential provided by the external power source.

4. The power switching circuitry of claim 1, wherein the sensing circuitry further comprises a second resistor, a first end of the second resistor is electrically coupled to the power supplying node, and a second end of the second resistor is electrically coupled to the first end of the light emitting diode.

5. An ethernet apparatus, comprising:
a working circuitry, being provided by a first electric potential and a second electric potential and operated accordingly; and
a power switching circuitry, comprising:
an external power socket, comprising a first socket pin, a second socket pin and a third socket pin, wherein the external power socket is adapted to be connected to an external power plug such that the first socket pin is electrically coupled to an external power source for receiving a first input power from the external power source through the external power plug and transmitting the first input power toward the working circuitry, the second socket pin is electrically coupled to the first electric potential, and whether the second socket pin is connected with the third socket pin is determined by whether the external power plug is connected to the external power socket;

an ethernet power supply pin, being electrically coupled to an ethernet cable for transmitting a second input power received from the ethernet cable toward the working circuitry;

a sensing circuitry, comprising:

a switch, comprising a control end, a first conducting end and a second conducting end, wherein whether the first conducting end is conducted with the second conducting end is determined by a voltage applied on the control end, and the second conducting end is electrically coupled to the first electric potential;

a first resistor, comprising two ends, wherein a first end of the first resistor is electrically coupled to a power supplying node on which an electric potential is the second electric potential, and a second end of the first resistor is electrically coupled to the control end and the third socket pin; and an optocoupler, comprising a light emitting diode and a light sensor, wherein a first end of the light emitting diode is electrically coupled to the power supplying node, a second end of the light emitting diode is electrically coupled to the first conducting end of the switch, and whether a first end of the light sensor is conducted with a second end of the light sensor is determined by whether the light emitting diode emits light; and a power output decision module, being electrically coupled to the ethernet power supply pin, the first end of the light sensor and the second end of the light sensor, wherein the second input power received from the ethernet power supply pin is stopped being transmitted toward the working circuitry when the first end of the light sensor is conducted with the second end of the light sensor.

6. The ethernet apparatus of claim 5, wherein the external power source is direct current power source.

7. The ethernet apparatus of claim 6, wherein the first electric potential is ground, and the second electric potential is the same as an electric potential provided by the external power source.

8. The ethernet apparatus of claim 5, wherein the sensing circuitry further comprises a second resistor, a first end of the second resistor is electrically coupled to the power supplying node, and a second end of the second resistor is electrically coupled to the first end of the light emitting diode.

* * * * *